United States Patent [19]

Finke

[11] Patent Number: 5,018,343
[45] Date of Patent: May 28, 1991

[54] COTTON PICKER SPINDLE LUBRICATION APPARATUS, METHOD AND LUBRICATION CARTRIDGE THEREFORE

[75] Inventor: Donald R. Finke, Lake Arrowhead, Calif.

[73] Assignee: Lubricating Specialties Company, Pico Rivera, Calif.

[21] Appl. No.: 477,645

[22] Filed: Feb. 9, 1990

Related U.S. Application Data

[63] Continuation-in-part of Ser. No. 349,112, May 5, 1984, abandoned.

[51] Int. Cl.$^5$ ............................................. A01D 46/16
[52] U.S. Cl. ....................................... 56/12.1; 56/12.3; 56/37; 56/41
[58] Field of Search ................... 56/36, 37, 40, 41, 28, 56/11.9, 12.1, 12.3, DIG. 5, DIG. 9; 184/7.3; 220/403, 400

[56] References Cited

U.S. PATENT DOCUMENTS

| | | | |
|---|---|---|---|
| 2,089,523 | 8/1937 | Wupper | 184/7.3 |
| 2,861,718 | 11/1958 | Winzeri | 220/400 |
| 3,405,514 | 10/1968 | Pulrang | 56/DIG. 5 |
| 4,452,032 | 6/1984 | Clevenger, Jr. et al. | 56/12.3 |
| 4,769,978 | 9/1988 | Reichen et al. | 56/28 |
| 4,815,631 | 3/1989 | Eeg et al. | 220/403 |
| 4,840,018 | 6/1989 | Deutsch | 56/41 |

Primary Examiner—Terry Lee Melius
Attorney, Agent, or Firm—Blakely, Sokoloff, Taylor, Zafman

[57] ABSTRACT

An improved lubrication system for the spindle bar assembly of a cotton harvester apparatus is disclosed. The system comprises a hydraulic pump connected to the hydraulic system of a harvester which pumps lubricant from a disposable cube of lubricant located on board the harvester into a manifold system having conduits in fluid communication with the existing lubrication system of the harvester, and a fluid restriction device disposed in line with the conduits to control the flow of lubricant to each spindle bar so that equal amounts of lubricant are provided thereto, notwithstanding differences in the lengths of the conduits.

9 Claims, 3 Drawing Sheets

COTTON PICKER SPINDLE LUBRICATION APPARATUS, METHOD AND LUBRICATION CARTRIDGE THEREFORE

RELATED APPLICATION INFORMATION

This application is a continuation in part of application Ser. No. 07/349,112 filed on May 5, 1989, now abandoned.

BACKGROUND OF THE INVENTION

1. Field of the Invention

This invention relates to cotton picker machines and their lubrication. More particularly, it relates to a novel process for the periodic application of grease to the rotating spindles and associated gear trains of a cotton picker machine without the delays and loss of production time required by conventional lubrication methods, apparatus for performing the lubrication and grease cartridges for retaining the lubrication until dispensed by the present invention.

2. Art Background

Cotton, the vegetable fiber produced by shrubs and small trees of the genus Gossypium, has been cultivated and utilized for at least five thousand years and still constitutes one of the leading cash crops of U.S. agriculture. Among the leading cotton-producing states are Texas, California, Mississippi, Arizona and Arkansas. In spite of the introduction of many synthetic fibers, cotton remains a principal raw material for the world's textile industry.

Successful cultivation of cotton requires a long growing season with abundant sunshine and water during the period of growth and dry weather when the cotton is ready for harvest. In different geographical areas, the crop matures at different times of the year. But it is critical that the crop be completely harvested in as short a period as possible—no longer than eighteen to twenty days. If harvesting is delayed beyond that point, the cotton will discolor and some will simply blow away. And of course there is always the danger of rain. Thus efficient utilization of time is extremely important, and any method of reducing lost time and "down time" will greatly improve the success of and the yield from the harvest.

One of the necessary tasks which heretofore has taken considerable time during the harvest is the lubrication of the harvesting machines, known as cotton pickers. Cotton pickers are self-propelled and utilize rows of spindles, rotating at speeds up to 4000 rpm, mounted upon moving bars. As the machine proceeds along a row of plants, the spindles, which are barbed, contact the cotton and pull it from the boll. The support bars continually carry the spindles pass a series of rubber fingers called "doffers" which pull the cotton fibers from the spindle, from which they are air-blown upwards through a chute into an overhead bin or "basket". The spindle bars, which travel on a track, then carry the spindles through a water-wash and air-drying stage and back to the front of the machine where they contact more plants and remove more cotton. Power to the spindles is supplied from a planetary gear system which drives individual complex shaft and gear train assemblies inside each of the hollow spindle bars. The spindles and associated gears and bearings are lubricated by a thin (NLGI Grade 00) grease known simply as cotton-picker grease, introduced into the bars through a series of lubricating ports. Approximately thirty two pounds of grease are required to fill a cotton picker spindle systemon a two row cotton picker machine.

Heretofore, application and replenishment of cotton picker spindle grease has consumed a significant amount of lost production time which is of critical importance during the hectic harvest period. Cotton picker grease is lost at an appreciable and unpredictable rate during the operation of the machine. Industry practice is to refill the bars after each ten hours of operation. This refilling operation cannot be done before the day's picking, inasmuch as the grease will not flow properly through the system until the machinery is warm. The conventional practice, therefore, has been to send a maintenance vehicle with grease applicators to meet and lubricate the cotton picker somewhere in the fields. The refilling operation done in this way normally takes from forty-five minutes to an hour, during which time the cotton picker is idle and unable to harvest.

The use of continuous grease applicators such as are customarily employed on large trucks and continuously operating machinery has not proved successful when applied to cotton pickers. The consumption of cotton picking grease during harvest does not occur at a uniform rate, and heretofore continuous application systems have not been found that could supply the required amount of grease in all parts of the system. A manufacturer of cotton picker machines recently incorporated a bulk reservoir mounted on the machine. Grease is pumped into the reservoir and periodically added to the system by a belt-driven pump with an electric clutch. This approach has the obvious disadvantage that the reservoir itself must be periodically filled, a time-consuming and labor intensive operation. The reservoir is mounted near the cotton basket at the top of the machines. Cotton dust can be ignited by a spark, and basket fires are not unusual; and the proximity of a large quantity of grease can increase the severity of the fire. This system has not been able to solve the problems of cotton-picker lubrication.

U.S. Pat. No. 4,769,978 discloses a lubrication distribution system for a cotton picker machine. A reservoir of grease is disposed on-board a cotton picker. In order to activate the lubrication system, an electric clutch is activated to couple a displacement pump to the engine (drive shaft) of the cotton picker which supplies grease under pressure to a manually operated two way valve which distributes the grease to all of the various areas of the cotton picker to be lubricated, first one area when the valve is in a first position, and then another area when the valve is in a second position. The distribution of the grease to the components to be lubricated is controlled by the length and internal diameter of the conduit carrying the grease to the lubrication points. Areas which require more grease have shorter tubing having a larger internal diameter. Areas requiring less grease have longer tubing with a smaller internal diameter. There are various problems with this device. The driving of the pump off of the drive shaft of the final drive via a belt has been shown to have various mechanical problems because of the infrequency of activation of the electric clutch as well as the difficult access to the drive shaft. Moreover, there is no disclosure that this system can be retrofitted onto existing cotton pickers, and it is not apparent that such retrofit is possible, at least not without some great difficulty and substantial modification to the existing devices. Further, the use of different length and diameter conduit makes it difficult to assemble the lubrication system, and such size differences of the conduit appear to be critical to the functioning of the subject invention.

SUMMARY OF THE INVENTION

It is an object of my invention to provide a process and apparatus for lubricating the spindle bars of a cotton picker without the need for a separate vehicle to carry out the lubrication. More importantly, it is an object of my invention to reduce the down time caused by lubrication from forty-five minutes to less than three. It is also an object of the present invention to improve the lubrication system in existing and new cotton pickers which will reduce the required maintenance of such cotton pickers and accordingly reduce the expense of upkeep of said cotton pickers.

I have discovered a lubrication process and means which eliminates the difficulties inherent in the use of maintenance trucks and reduces the lubrication time from the current forty five or more minutes to less than three. The novel process of my invention makes use of the following:

(a) A pre-measured exact quantity of grease in a disposable container;
(b) Connecting means and associated piping, tubing or hosing to carry the grease from the container to
(c) Pumping means consisting of a positive displacement pump with a pressure regulator;
(d) A hydraulic motor compatible with the on-board hydraulic system of the cotton-picker, with proper displacement necessary to operate the pumping means (c) at a rate that will carry the grease at the desired rate from (c) into
(e) Manifolding and associated tubing having sized couplings to control the volume of grease dispensed at each location, to carry a predetermined amount of grease to the lubrication points in the spindle bar system.

The invented process comprises the steps of providing a premeasured quantity of grease in a disposable container specially adapted to connect with the invented lubrication distribution system, pumping said grease from said disposable container into several manifolds and distributing said grease in substantially equal quantities to the spindle bar assemblies.

The present invention also particularly comprises a disposable container of grease adapted for use in connection with the subject apparatus and method. The disposable container comprises preferably a cardboard box with a plastic liner, said liner being filled with sufficient grease to perform a complete lubrication (about 35 pounds) and a coupling means for coupling said disposable container to the lubrication system.

The invented apparatus comprises a cotton harvester including a plurality of picker drums and having:

(a) a pre-measured quantity of grease in a disposable container;
(b) pumping means for pumping said grease from said container to said picker drums;
(c) a hydraulic motor compatible with the on-board hydraulic system of the cotton harvester adapted to operate the pumping means at a desired rate; and
(e) Manifold means for distributing said grease to said picker drums and sized couplings disposed between said manifold means and said picker drums, to control the amount of grease dispensed to the lubrication points in the spindle bar system.

DETAILED DESCRIPTION OF THE INVENTION

Figure 1:
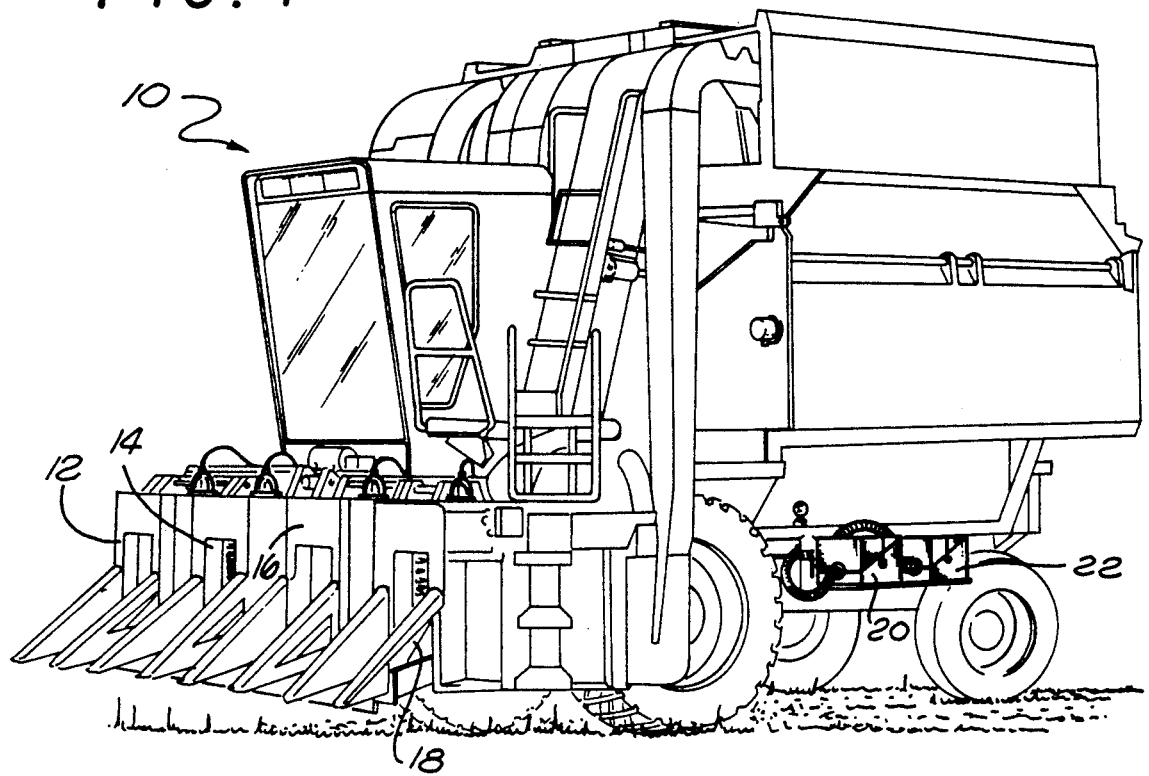
FIG. 1 is a perspective view of a cotton picker comprising the present invention lubrication system disposed in its preferred location.

The novel process of my invention makes use of the following:

(a) A pre-measured exact quantity of grease in a disposable container;
(b) Connecting means with associated piping, tubing, or hosing to carry the grease from the container to
(c) Pumping means consisting of a positive displacement pump with a pressure regulator;
(d) A hydraulic motor compatible with the on-board hydraulic system of the cotton-picker, with proper displacement necessary to operate the pumping means (c) at a rate that will carry the grease at the desired rate from (c) into
(e) Manifolding and associated tubing to carry the grease to the lubrication points in the spindle bar system.

These elements will now be discussed in detail.

Several types of disposable container are useful in the process of my invention. The main requirement, of course, is that they be compatible with cotton picker grease and have a capacity of approximately 35 pounds, the amount required to fill the cotton picker spindle bar assembly. Of particular utility in my invention is the disposable cube. This container, comprising a cubical cardboard of plastic box containing a plastic bag with a tube in the bottom through which the contents are removed, has not previously been employed for grease, though it is familiarly used to dispense milk in the restaurant and fast food industries. The cube has the advantage that it can easily be positioned in an open space within the body of the cotton picker.

The selection of suitable connecting means between the disposable container and the pump are considered to be well within the skill of the ordinary worker or machine operator. When the cube is used, it is essential that the connections be air-tight. As the grease is discharged through the pump, the plastic bag collapses, preventing air from entering the system. Use of a connector which extends into the bag and is fitted with a barb or cutting device to puncture the bag once it is emptied is a useful technique for insuring that the bag itself will not be pulled into the piping once the grease is exhausted.

The pump should be a positive displacement pump, preferable of the gear or piston type, capable of pumping the grease at the desired rate to achieve a three-minute lubrication period. In conjunction with the pump, a pressure regulator is used to insure that line pressure will not exceed the maximum limit set out by the manufacturer of the cotton picker for the spindle bar system. This is usually 65 psig. at the lubrication points.

The pump is operated by a hydraulic motor incorporated into the open loop accessory circuit of the cotton picker hydraulic system. A cotton picker utilizes an on-board hydraulic system for power steering, for raising and lowering the front booms that precede the spindles along the rows for dumping the basket, and for other functions. It is a relatively simple operation to incorporate a three-way-valve into the hydraulic line from which hydraulic pressure can be obtained to operate the hydraulic motor and drive the pump. The engineering necessary to size the hydraulic motor, the pump, and the associated tubing, manifolding, and connectors, so that the pre-measured quantity of grease can be fed into the spindle bar assembly within three minutes at a pressure less than 65 psig. is considered to be within the skill of the ordinary worker.

The operation of the lubrication equipment described hereinabove is simple. When the machine has completed ten hours of operation and is ready for re-lubrication of the spindle bars, pressure from the hydraulic system is delivered to the hydraulic motor which in turn drives the pump, thereby discharging the pre-measured grease from the disposable container into the spindle bar system. By selection of readily available equipment, this system can refill the bars within three minutes, thereby minimizing down time for the machine. It will be found that, using the process and means of my invention, most of the grease in the container is utilized, thereby minimizing waste and disposal problems. The equipment can be mounted in any convenient location within the body of the cotton picker. It is desirable, of course, that the container be mounted near the base, so that empty containers can be removed and fresh ones added with a minimum of difficulty.

The operation of the process of my invention will now be illustrated by the following Example.

EXAMPLE ONE

The test machine was a John Deere 9910 Model Cotton Picker containing two rows of spindles. The machine was ten years old and was one of the three identical machines used in this harvest. The cotton picker spindle grease used was supplied in 35 pound disposable cubes. The grease was manufactured by Lubricating Specialties Company, Pico Rivera, Calif., and had the following typical properties:

NLGI Grade: 00
Soap: Lithium hydroxystearate
Soap Concentration: 3.5% minimum
Oil Viscosity: 20.I cSt @40° C.

The cube of grease was connected by an airtight connection through a one-inch suction line to a positive displacement gear pump run by a TRW Ross hydraulic motor, fed by a "pressure beyond" valve in the open-loop accessory hydraulic circuit of the machine. Valving and pressure transducers were added to the system to provide a test device for the oil pressure in the system. System volume and displacement were sized to provide a pump speed of approximately 500 rpm. Outport from the pump, the grease ran through a pressure regulator set at 65 psig. maximum grease pressure, measured at the lubrication points, and then into the spindle bar system.

This machine was used during a full harvest lasting eighteen days, along with the two other machines of the same make. My process was used to provide spindle lubrication to the test machine whereas a maintenance truck was used to service the other two cotton pickers. The test machine harvested almost 600 acres during the harvest, approximately a 20% improvement in yield. Five hundred and fifty acres had previously been normal for this machine.

Figure 5:
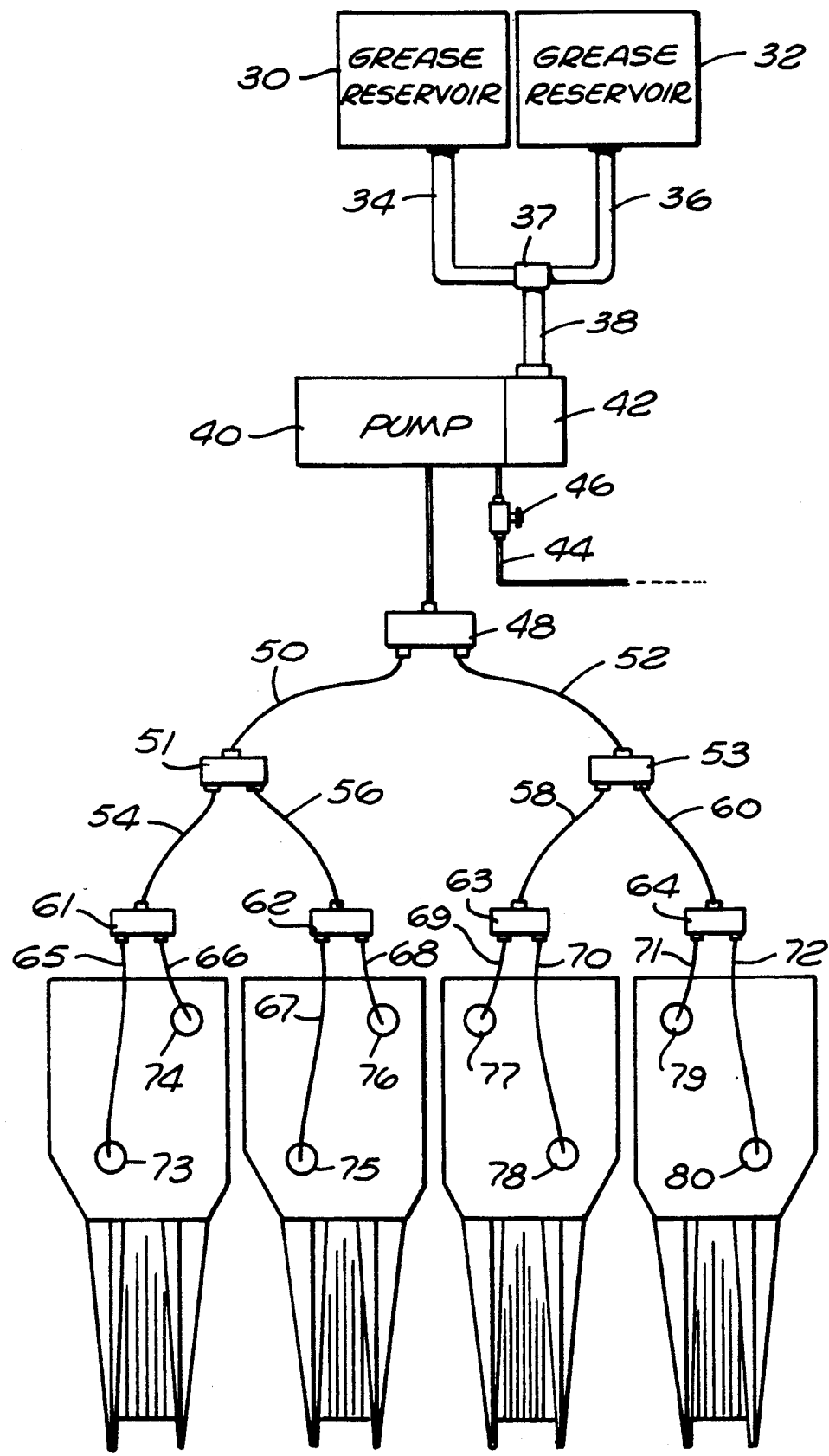
FIG. 5 is a block diagram illustrating the subject invention.

The present invention will now be described with reference to the drawings appended hereto. Fig. 1 shows a cotton picker or cotton harvesting machine generally referred to as 10, with four rows of harvesting units designated as 12, 14, 16 and 18. As shown on the side of the cotton picker 10, two disposable containers containers of grease 20 and 22 are disposed thereon with conduit removably attached thereto to provide fluid communication between said containers and the remainder of the lubrication system. It will be appreciated by a person of ordinary skill in the art that the use of one, two or a plurality of grease containers is a matter of design choice. The grease is distributed to the harvesting units, and particularly to each row of cotton picker spindles through the existing lubrication system on the cotton picker. As shown in FIG. 5, the grease is supplied by the grease reservoirs 30 and 32 through conduit 34 and 36 into conduit 38 and into pump 40 which is driven by hydraulic motor 42 driven by the existing hydraulic system of the cotton picker, depicted as line 44 which is connected via valve 46 to pump 42. The pump 42 then pumps the grease into manifold 48, which in turn splits the stream into conduits 50 and 52, and the stream is split again into conduits 54, 56, 58 and 60 via manifolds 51 and 53 and then again into manifolds 61, 62, 63 and 64. From manifolds 61, 62, 63 and 64 each stream of grease is split into two, and is sent through a shorter conduit 66, 68, 69 and 71, respectively, and longer conduit 65, 67, 70 and 72 and into respective fittings 73 through 80. The shorter and longer conduits conform to the positioning of the lubrication shafts on the drums of the harvest units. The fittings associated with the shorter conduits, namely, 74, 76, 77, and 79 are smaller in internal diameter than the fittings associated with the longer conduit, namely, 73, 75, 78, and 80 in order to compensate for the extra resistance of the longer conduit so that an equal amount of grease is pumped to each of the lubrication points, the smaller fittings creating the extra resistance to compensate for the extra length of the conduit. It is important to note that all parallel lines of conduits with the exception of the last set of short and long conduits 65–72 are substantially the same length and all of the conduits, including the last set 65–72 are the same diameter. Thus the setup of the lubrication system and the replacement of any conduit does not require the maintenance of a large stock of conduit of differing lengths and internal widths.

Figure 2:
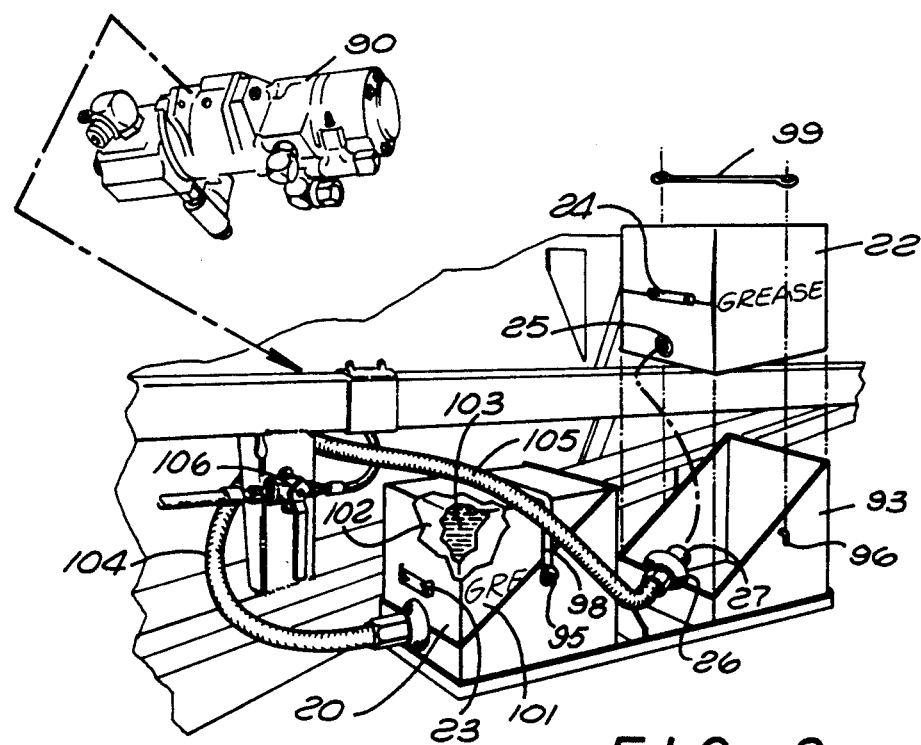
FIG. 2 is an enlarged, partially exploded drawing of a portion of the cotton picker showing a portion of the lubricating apparatus, the grease container and the pump.

FIG. 2 shows an enlarged section of the cotton picker of FIG. 1 and specifically the lubrication system. The pump and hydraulic motor 90 are shown illustrating their attachment site to the cotton picker, with the hydraulic motor 91 attached to the pump 92. A grease bins 93 and 94 are provided to hold the disposable grease containers 20 and 22. They each have hook members 95 and 96, and corresponding hook members on the opposite side (not shown) to hold retaining members 98 and 99 for securing the containers in the bins. As shown, grease container 22 is illustrated in partial cutaway view. Container 20 has a handle 23 and container 22 has a handle 24. A hole 25 is shown in container 22 for providing access to the interior thereof by the grease connector 26. As shown in the cutaway portion of container 20, the disposable container 20 comprises and outer cardboard layer 101, an inner plastic liner 102, with grease 103 disposed within the plastic liner. The grease connector 26 has a sharp, serrated or spiked edge 27 so that when the plastic liner 102 is empty, the edge 27 punctures it eliminating the vacuum to prevent the liner from being sucked into the conduit 105. Valve 106 is provided to turn on and off the hydraulic power to the hydraulic motor and pump. Thus when valve 106 is closed, the pump is shut off.

Figure 3:
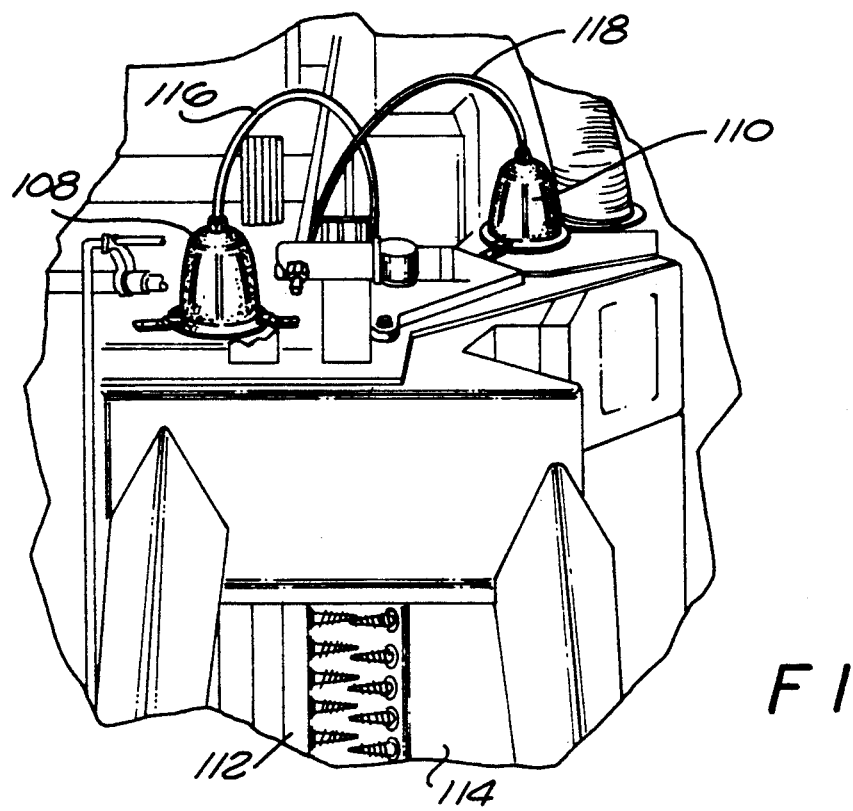
FIG. 3 is an enlarged drawing of a portion of the cotton picker taken from the front of the cotton picker showing the distribution manifold.
Figure 4:
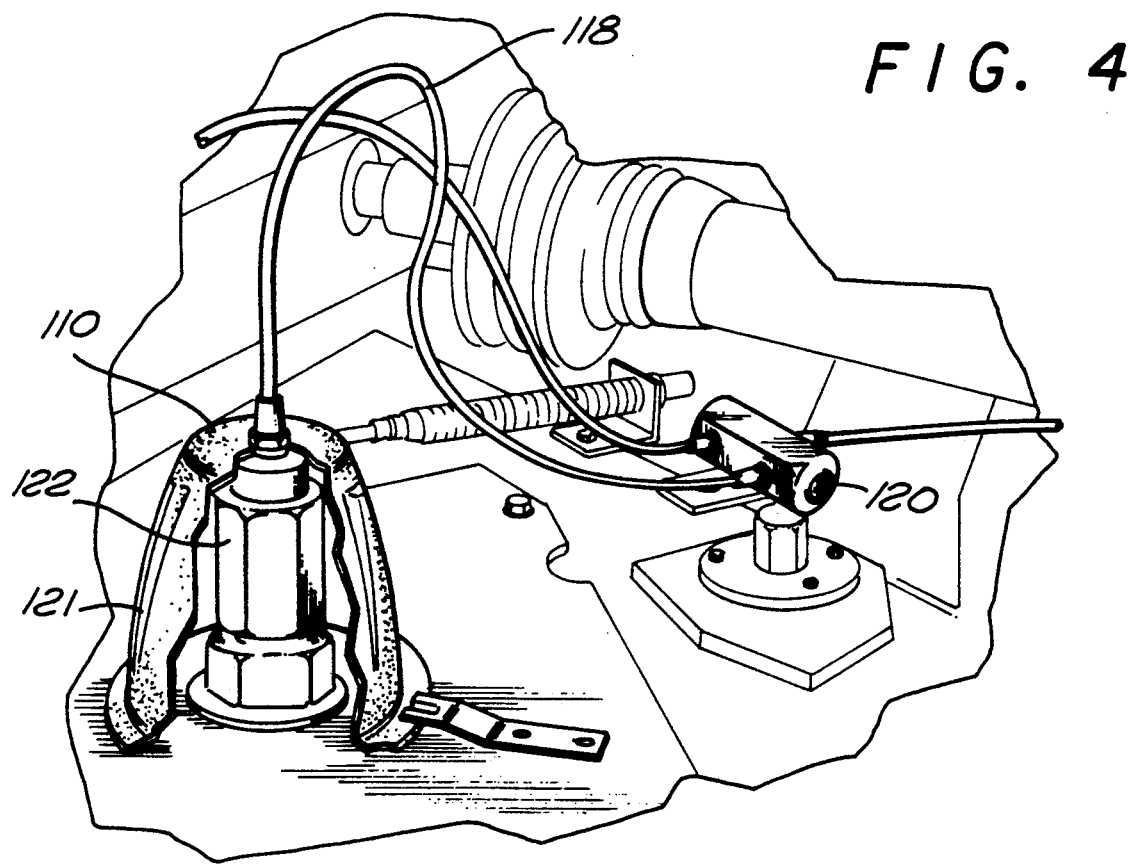
FIG. 4 is an enlarged side view of the portion of the cotton picker shown in FIG. 3.

As shown in FIGS. 3 and 4, each harvest unit has two drums, each drum having its own lubrication shaft. Thus, for the drums depicted in FIG. 3, one lubrication fitting 108 is located closer and the other lubrication fitting 110 further from the front of the machine, with fitting 108 being associated with cotton picker row 112 and fitting 110 being associated with row 114. The fittings 108 and 110 are specially sized internally to provide the requisite amount of resistance to compensate for the longer length of conduit of conduit 116 as compared with conduit 118 so that equal amounts of grease are provided to each drum. In the preferred embodiment for the specific test cotton pickers, the longer length conduit 116 has associated with it a fitting 108 which has an internal diameter of 0.160 inches, and the shorter length conduit has associated with it a smaller fitting 110 having an internal diameter of 0.060 inches. FIG. 4 specifically depicts manifold 120 which splits the grease stream into two streams and also shows that fitting 110 comprises cap 121 in cutaway to illustrate fitting 122.

Numerous modifications and additions can be made to the process of my invention without departing from the spirit and scope thereof. For example, a timing device can be added to the system to alert the machine operator when the cotton picker has completed ten hours of operation and is in need of relubrication. The above example is by way of illustration and is not meant to be limiting within the scope of the following claims.

What is claimed is:

1. In a mobile cotton harvester having a plurality of picker drums comprising a plurality of rows of spindles, each drum having a lubrication-receiving means, a spindle lubrication system comprising:
    a lubricant reservoir located on said harvester, said lubricant reservoir comprises a disposable reservoir comprising a cardboard box, a plastic liner in said cardboard box, and a predetermined amount of grease disposed in said liner;
    a lubricant pump having an input connected to said lubricant reservoir and an output for providing said lubricant under pressure;
    a lubricant distributing means for distributing equal amounts of lubricant to said each of said picker drums, said lubricant distributing means comprising a supply conduit connected to said output of said pump, at least one manifold means, conduit means connected at one end to said manifold means and at the other end to picker drum fittings associated with each picker drum, said conduit means having a unitary internal diameter and being of different lengths to attach to different picker drum fittings;
    said picker drum fittings connected to said lubrication-receiving means and having an internal diameter selected to provide predetermined resistance to the flow of said lubricant into each of said picker drums such that each picker drum receives an equal amount of lubricant notwithstanding the different lengths of conduit means attached thereto.

2. The mobile cotton harvester of claim 1 wherein said lubricant reservoir has disposed therein 20 to 40 pounds of grease disposed in said liner.

3. The mobile cotton harvester of claim 1 further comprising a connecting means for connecting said pump input to said reservoir, said connecting means comprising a sharpened end.

4. The mobile cotton harvester of claim 1 wherein said pump comprises a hydraulic motor adapted to be powered from a hydraulic system of said harvester.

5. In a mobile cotton harvester having a plurality of picker drums comprising a plurality of rows of spindles, each drum having a lubrication-receiving means, a spindle lubrication system comprising:
    a lubricant reservoir located on said harvester, said lubricant reservoir comprising a cardboard box, a plastic liner in said cardboard box, and 20 to 40 pounds of grease disposed in said liner;
    a lubricant pump having an input connected to said lubricant reservoir and an output for providing said lubricant under pressure, said pump comprising a hydraulic motor adapted to be powered from a hydraulic system of said harvester;
    a connecting means for connecting said pump input to said reservoir, said connecting means comprising a sharpened end for penetrating said liner when said reservoir is empty;
    a lubricant distributing means for distributing equal amounts of lubricant to said each of said picker drums, said lubricant distributing means comprising a supply conduit connected to said output of said pump, at least one manifold means, conduit means connected at one end to said manifold means and at the other end to picker drum fitting associated with each picker drum, said conduit means having a unitary internal diameter and being of different lengths to attach to different picker drum fittings;
    said picker drum fittings connected to said lubrication-receiving means and having an internal diameter selected to provide predetermined resistance to the flow of said lubricant into each of said picker drums such that each picker drum receives an equal amount of lubricant notwithstanding the different lengths of conduit means attached thereto.

6. The harvester of claim 5 further comprising a valve means disposed between said hydraulic system of said harvester and said pump to control the supply of hydraulic power to said pump.

7. The harvester of claim 6 wherein said hydraulic pump is capable of pumping approximately 40 pounds of grease into said picker drums in approximately 3 minutes.

8. The harvester of claim 5 wherein a plurality of lubricant reservoirs are provided comprising a total of approximately 40 pounds of grease.

9. A lubrication system for lubricating the spindle bar assembly of a mobile cotton harvester, said system comprising:
    a disposable lubricant reservoir located on said harvester;
    a hydraulically powered lubricant pump having an input connected to said lubricant reservoir and an output for providing said lubricant under pressure, said pump being adapted to be connected to a hydraulic system of said harvester;

a lubricant distributing means for distributing equal amounts of lubricant to picker drums of said harvester, said lubricant distributing means comprising a supply conduit connected to said output of said pump, at least one manifold means, conduit means connected at one end to said manifold means and at the other end to picker drum fittings associated with each picker drum, said conduit means having a unitary internal diameter and being of different lengths to attach to different picker drum fittings;

said picker drum fittings for connection to a lubrication-receiving means of said harvester, said drum fittings having an internal diameter selected to provide predetermined resistance to the flow of said lubricant into each of said picker drums such that each picker drum receives an equal amount of lubricant notwithstanding the different lengths of conduit means attached thereto.

* * * * *